United States Patent [19]

Iwaki

[11] 4,341,967
[45] Jul. 27, 1982

[54] CHARGING GENERATOR FOR VEHICLE
[75] Inventor: Yoshiyuki Iwaki, Himeji, Japan
[73] Assignee: Mitsubishi Denki Kabushiki Kaisha, Tokyo, Japan
[21] Appl. No.: 243,144
[22] Filed: Mar. 12, 1981
[30] Foreign Application Priority Data
  Mar. 21, 1980 [JP] Japan ............... 55/37955[U]
[51] Int. Cl.³ .............................................. H02K 5/10
[52] U.S. Cl. ............................ 310/88; 310/89; 310/42; 310/240; 277/72 FM
[58] Field of Search .............. 310/51, 228, 232, 239, 310/242, 243, 263, 68, 85, 89, 90; 29/597; 74/606 R; 192/112; 277/72 FM

[56] References Cited
U.S. PATENT DOCUMENTS
1,805,155 5/1931 Weeks .................. 277/72 FM
2,323,146 6/1943 Manney ................. 310/88
3,538,362 11/1970 Cheetham et al. ........... 310/68
4,103,193 7/1978 Ito ...................... 310/68 D
4,177,998 12/1979 Laitkep et al. ........... 277/72 FM Primary Examiner—J. D. Miller
Assistant Examiner—D. L. Rebsch
Attorney, Agent, or Firm—Oblon, Fisher, Spivak, McClelland & Maier

[57] ABSTRACT

A charging generator for a vehicle comprises a stator; a rotor facing said stator with a gap; a pair of slip-rings mounted on said rotor; a pair of brushes sliding on said slip-rings; a brush holder for holding each said brush; a first hole formed on the pair of said brushes in the shaft direction; a housing which holds said rotor; a second hole formed on said housing to insert a pin into said first hole from outside of said housing so as to detach said brushes from said slip-rings; a lubricant for sealing said second hole; and a lubricant holder for holding said lubricant which is placed near said second hole.

1 Claim, 4 Drawing Figures

CHARGING GENERATOR FOR VEHICLE

BACKGROUND OF THE INVENTION

1. Field of the Invention:

The present invention relates to an improvement of a charging generator which charges a battery for a vehicle.

2. Description of the Prior Arts:

Referring to FIG. 1 as a sectional view, a conventional charging generator for a vehicle will be illustrated.

In FIG. 1, the reference numeral (1) designates a rotor shaft; (2) designates a pulley which is mounted on one end of the rotor shaft together with a fan (3) by a screw (4); (5) designates a rotor mounted on the rotor shaft (1) under pressure and the rotor comprises N, S magnetic poles and coils for magnetizing the magnetic poles; (6) designates a pair of slip-rings mounted on the rotor shaft (1) under presssure and the slip-rings are respectively connected to the coils; (7) designates a bowl-shaped housing which holds the other end of the rotor shaft (1) by a bearing (8); (71) designates a hole for communicating both sides of the housing (7); (8) designates a screw for sealing the hole (71) by screwing into the hole; (9) and (9) respectively a pair of brushes for sliding on the slip-rings (6); (10) designates brush holder for holding the brushes; and the brush (9) and the brush holder (10) respectively have throughholes (9a), (10a) formed in the shaft direction. The reference numeral (11) designates a stator which comprises iron cores placed to face the magnetic poles with each small gap and coils around each of the iron cores; (12) designates a rectifier which is inwardly held on the housing (7) to rectify AC output generated in the coils of the stator (11); and (13) designates bowl-shaped front bracket for holding one of the rotor shaft (1) by the bearing (14) and the bracket has a fitting hole (13a).

Usually, the conventional charging generator has structure for outwardly holding the brushes (9) for assembling ease.

In the apparatus shown in FIG. 1, a pin is inserted into the hole (71) formed on the housing (7) from the outside and the pin is further inserted into the hole (9a), formed on the brush (9) and the hole (10a) formed on the brush holder (10) to hold the brush (9). When the pin is not used, water, fine dust and straw dust are inwardly penetrated through the hole (71) of the houssing (7) to adhere to the brush (9) whereby the function of the generator is lost or severe inner rust is formed.

It has been proposed to seal the hole (71) of the housing (7) by a screw (8) as shown in FIG. 1 in order to prevent such trouble. In such structure, the head of the screw is projected in the shaft direction to increase the length in the shaft direction. When the charging generator is equipped in a car, the projected head interrupts the assembly of the other parts. Moreover, the position of the hole for inserting the pin is not easily found. In commercial service, the screw (8) should be taken out for inserting the pin into the hole (71) to cause inferior service.

The apparatus shown in FIG. 2 has been proposed to overcome the disadvantages of the apparatus shown in FIG. 1. In this apparatus, a hardened resin (15) is filled into the hole (71) of the housing (7). In the apparatus shown in FIG. 2, the screw (8) is not used whereby the length in the shaft direction can be shortened in comparison with the apparatus shown in FIG. 1. Moreover, the specific part is not needed to be economical. As shown in FIG. 2, however, the resin (15) may be inwardly penetrated whereby the brush (9) may adhere to the brush holder (10) due to the resin and the function of the brush (9) may be lost. Moreover, it is not easy to remove the resin in the disassembling or testing of the apparatus in commerce. The resealing with the resin may not be carried out in a service shop after reassembling. These disadvantages have been found.

SUMMARY OF THE INVENTION

It is an object of the present invention to overcome the above-mentioned disadvantages and to provide a charging generator for a vehicle in which a hole for insetting a pin is sealed without a projection so as to prevent penetration of water, fine dust and straw dust.

The foregoing and other objects of the present invention have been attained by providing a charging generator for a vehicle which comprises a stator; a rotor facing said stator with a gap; a pair of slip-rings mounted on said rotor; a pair of brushes sliding on said slip-ring; a brush holder for holding each said brush; a first hole formed on the pair of said brushes in the shaft direction; a housing which rotatably holds said rotor; a second hole formed on said housing to insert a pin into said first hole from outside of said housing so as to detach said brushes from said slip-rings; a lubricant for sealing said second hole; and a lubricant holder for holding said lubricant which is placed near said second hole.

DETAILED DESCRIPTION OF THE PREFERRED EMBODIMENTS

Figure 1:
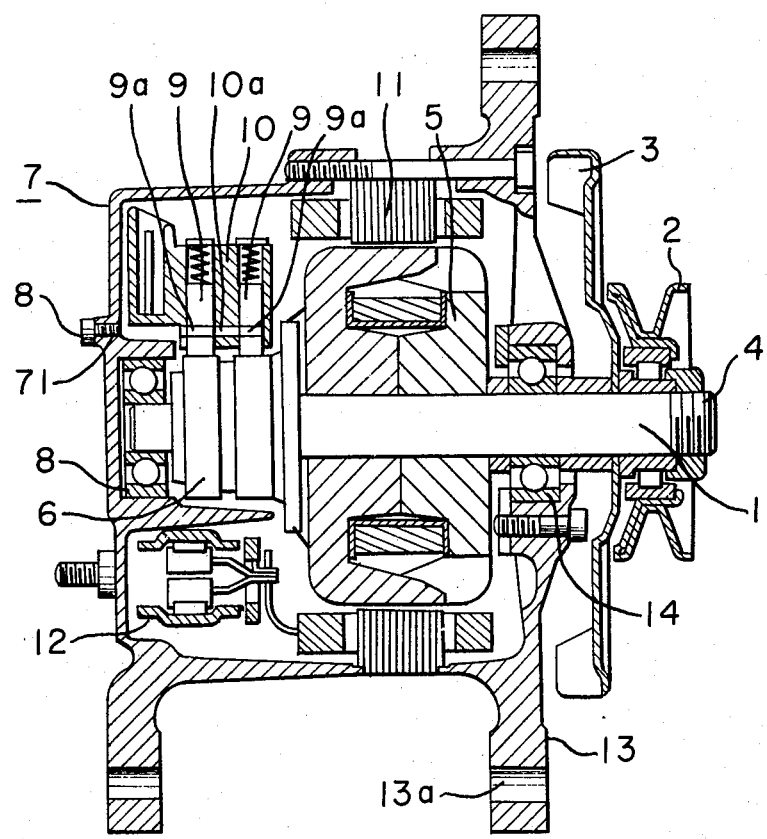
FIGS. 1 and 2 are respectively sectional views of embodiments of the conventional charging generator.
Figure 2:
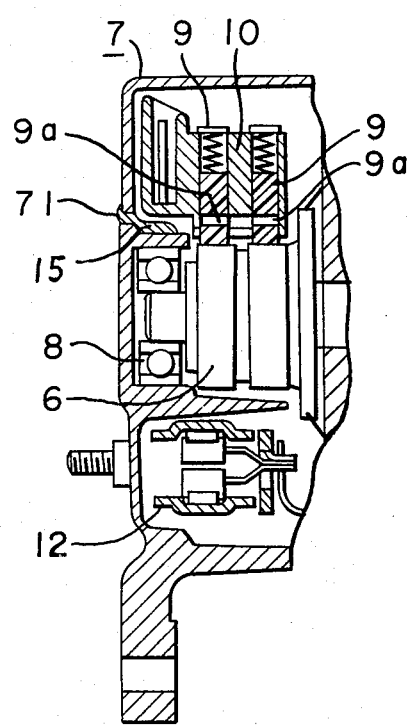
Figure 3:
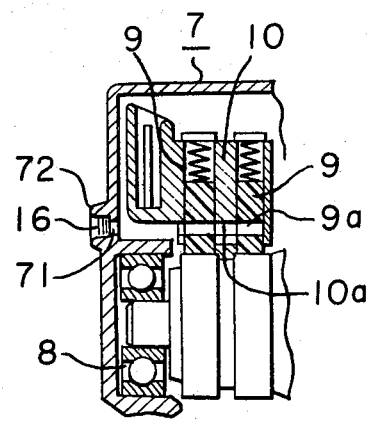
FIGS. 3 and 4 are respectively partially enlarged sectional view of embodiments of the charging generator of the present invention.

Referring to FIG. 3, one embodiment of the charging generator for a vehicle of the present invention will be illustrated.

In FIG. 3, the reference numeral (72) designates a cylindrical part which is mounted on the housing (7) to surround the hole (71) of the housing (7) and to outwardly project in the shaft direction; (16) designates a lubricant having relatively high viscosity such as grease filled in the cylindrical part. The hole (71) of the housing (7) is sealed by the lubricant (16) to shut the passage for the cooling air in the generator, and the penetration of water, fine dust and straw dust from the outside can be prevented. In the conventional apparatus having a mechanical screw sealing or a resin sealing, water may penetrate through a fine gap due to surface tension. On the other hand, in this embodiment, the hole is sealed by grease, through which water does not penetrate. The results are excellent. The cylindrical part (72) is formed by surrounding the hole (71) of the housing (7) and projecting the cylindrical part 72 in the shaft direction, and the grease (16) is filled in the cylindrical part (72) whereby the pin (not shown) can be easily inserted through the grease (16) and moreover, the hole can be easily sealed again after assembling the brushes and pulling out the pin.

In view of commercial service, grease or other lubricant can be used whereby the operation for sealing the hole (71) of the housing can be easily carried out after the testing and reassembling.

Figure 4:
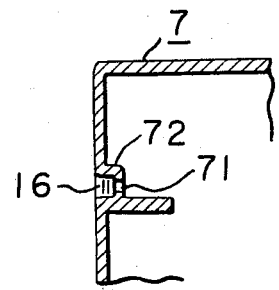

FIG. 4 shows the other embodiment of the present invention. The cylindrical part (72) for surrounding the hole (71) of the housing is inwardly projected in the housing (7). In such structure, the length in the shaft direction can be shortened together with the results of the embodiment of FIG. 3.

In the description of the embodiments, the cylindrical part (72) is considered to be perfectly round cylindrical form, however, the part (72) can be another cylindrical form beside the round cylindrical form, or can be a cylindrical form having a notched part. The part (72) can be any shape capable of holding a lubricant such as grease.

In accordance with the present invention, the charging generator has the structure for separating the brushes from the slip-rings by inserting the pin into the hole of the housing from the outside and the hole of the housing is sealed by the lubricant such as grease, and the holder for holding the lubricant is formed near the hole. The length in the shaft direction can be shortened in comparison with the conventional structure sealing the hole by a screw whereby interference with to the other parts in the equipment in a vehicle can be prevented and the descrewing operation can be eliminated to give better commercial service. The penetration of the resin to adhere to the brushes in the sealing by the resin can be eliminated and the resin removing operation can be eliminated in the commercial testing. The charging generator having a simple structure and the advantageous results can be provided.

What is claimed as new and desired to be secured by Letters Patent of the United States is:

1. A charging generator for a vehicle, comprising:
   a stator;
   a rotor facing said stator and separated therefrom by a gap;
   at least one slip ring mounted on said rotor;
   brush means for contacting each said slip ring;
   a brush holder supporting each said brush means;
   first bore means extending through said brush means, said first bore means extending coaxially and being parallel to the axis of said rotor;
   a housing surrounding said rotor;
   second bore means coaxial with said first bore means and having a first diameter, said second bore means extending through said housing such that a pin can pass through said first and second bore means;
   a lubricant holder for holding a viscous grease lubricant, said lubricant holder being positioned against one end of said second bore means opposite said brush holder, said lubricant holder being defined by walls extending parallel to said axis of said rotor and spaced from one another by a distance greater than said first diameter of said second bore means, whereby said pin passing through said first and second bore means will not completely fill said reservoir; and
   a viscous grease plugging means filling said lubricant holder and sealing said one end of said second bore means,
   whereby said pin passing through said first and second bore means will pierce and displace said grease plugging means and said walls will retain said grease plugging means in said reservoir.

* * * * *